(12) United States Patent
Cole Thomas

(10) Patent No.: US 10,713,916 B1
(45) Date of Patent: Jul. 14, 2020

(54) CHILD MONITOR FOR THE HEARING IMPAIRED

(71) Applicant: Kathleen Cole Thomas, Avenel, NJ (US)

(72) Inventor: Kathleen Cole Thomas, Avenel, NJ (US)

( * ) Notice: Subject to any disclaimer, the term of this patent is extended or adjusted under 35 U.S.C. 154(b) by 126 days.

(21) Appl. No.: 15/946,932

(22) Filed: Apr. 6, 2018

Related U.S. Application Data

(60) Provisional application No. 62/482,438, filed on Apr. 6, 2017.

(51) Int. Cl.
| | |
|---|---|
| *G08B 21/02* | (2006.01) |
| *H04N 7/18* | (2006.01) |
| *H04R 1/04* | (2006.01) |
| *H04R 1/02* | (2006.01) |
| *H04R 29/00* | (2006.01) |
| *G10L 25/51* | (2013.01) |

(52) U.S. Cl.
CPC .......... *G08B 21/0205* (2013.01); *G10L 25/51* (2013.01); *H04N 7/185* (2013.01); *H04R 1/025* (2013.01); *H04R 1/04* (2013.01); *H04R 29/00* (2013.01)

(58) Field of Classification Search
CPC ..... A61B 5/01; A61B 5/0022; A61B 5/02055; A61B 5/747; A61B 2503/04; A61B 5/024; A61B 5/02438
See application file for complete search history.

(56) References Cited

U.S. PATENT DOCUMENTS

| | | |
|---|---|---|
| 5,938,619 A | 8/1999 | Dogre Cuevas |
| 6,764,451 B2 | 7/2004 | Holland et al. |
| 2002/0097155 A1 | 7/2002 | Cassel et al. |
| 2007/0241911 A1 | 10/2007 | Swan et al. |
| 2008/0106421 A1 | 5/2008 | Adams et al. |
| 2010/0201524 A1 | 8/2010 | Gallagher |
| 2011/0267462 A1 | 11/2011 | Cheng et al. |
| 2012/0203078 A1* | 8/2012 | Sze ............... G06F 19/3418 600/301 |
| 2012/0299732 A1 | 11/2012 | Vogel |

(Continued)

FOREIGN PATENT DOCUMENTS

WO   2004075750 A1   10/2004

OTHER PUBLICATIONS

Now hear this—a solution for hearing impaired parents. Article [online]. Copyright © Aceville Publications Ltd [retrieved on Jun. 14, 2016]. Retrieved from the Internet: <URL: http://www.accessmagazine.co.uk/now-hear-solution-hearing-impaired-parents/>.

(Continued)

*Primary Examiner* — Obafemi O Sosanya
(74) *Attorney, Agent, or Firm* — Cramer Patent & Design, PLLC; Aaron R. Cramer

(57) ABSTRACT

A monitor for the hearing impaired includes a base device in wireless communication with a remote device. The base device procures data relative to a child in proximity to the device and relays that data to the remote device. Both devices comprise a plurality of lights, vibrating means, video monitors, and time indicators. The remote device is preferably capable of being worn on a wrist of a user and is capable of interacting and receiving data from a biometric device. The biometric device is configured to be worn by the child being monitored.

6 Claims, 4 Drawing Sheets

(56) References Cited

U.S. PATENT DOCUMENTS

2013/0181833 A1     7/2013   Al-Ali
2015/0157263 A1*   6/2015   Workman ............ A61B 5/6807
                                                                                    600/324

OTHER PUBLICATIONS

Oricom Secure 710 Baby Monitor. Product listing [online]. Copyright 2013—Baby Monitors R Us [retrieved on Jun. 14, 2016]. Retrieved from the Internet: <URL: http://babymonitorsrus.com.au/oricom-secure-710-video-baby-monitor/>.

* cited by examiner

CHILD MONITOR FOR THE HEARING IMPAIRED

RELATED APPLICATIONS

The present invention was first described in and claims the benefit of U.S. Provisional Patent Application No. 62/482,438 filed on Apr. 6, 2017, the entire disclosures of which are incorporated herein by reference.

FIELD OF THE INVENTION

The present invention relates generally to child monitor for the hearing impaired comprising a wearable receiver in wireless communication with a remote monitoring device monitoring a monitored user, and in certain embodiments, in wireless communication with a wearable biometric sensor to be worn on the monitored user.

BACKGROUND OF THE INVENTION

While caring for a newborn baby can be one (1) of the most rewarding duties a person may bear, it is often one (1) of the most traumatizing. Many parents or care providers turn to aids to help them care for their charges while still engaging in other activities or tasks around the home. Perhaps the most common of these is that of the child monitor.

Consisting of a transmitter in the child's room or location and a receiver in the parents or care provider's location, these devices allow users to engage in other tasks while still providing continuous monitoring of the child's well-being. More recent models offer the ability to transmit video as well. However, these devices are typically table-top units and may even be plugged in the wall, thus severely limiting their portability, especially when the parent or care provider must go to another room. As many household activities take place in many rooms simultaneously, the ability to see the baby or the monitor is often limited.

Finally, for parents or care providers who are hearing impaired, such monitors only provide aid if they visually monitored continuously to assure the child's well-being, which is not practical. Accordingly, there exists a need for a means by which the shortcomings of current monitor systems can be addressed, especially for the hearing impaired. The development of the monitor for the hearing impaired fulfills this need.

SUMMARY OF THE INVENTION

To achieve the above and other objectives, the present invention provides for a child monitoring system, comprising a transmitting unit which in turn comprises a housing defining an interior, a power source, a transmitting unit microprocessor in electrical communication with the power source, a video camera disposed upon an exterior surface of the housing in electrical communication with the transmitting unit microprocessor and a transmitter in electronic communication with the transmitting unit microprocessor. The system also comprises a receiving unit which is in wireless communication with the transmitting unit having a rechargeable power source in electrical communication with a receiving unit microprocessor and receiving unit receiving antenna. The receiving unit is capable of being worn on a monitoring user. The transmitting unit generates a transmission comprising a video signal data, an audio signal data and an alert signal data. The transmission is transmitted to the receiving unit. The receiving unit alerts the monitoring user to the receipt of the transmission.

The transmitting unit further comprises a microphone which is capable of generating the audio signal data of the transmission. The transmitting unit further comprises a transmitting unit indicator light which is disposed upon the exterior surface of the housing adjacent the video camera and is in electrical communication with the transmitting unit microprocessor.

The receiving unit may comprise a video display configured to display the video signal data from the first transmission, a speaker configured to emit the audio signal data from the transmission and/or a vibrating assembly configured to vibrate upon receipt of the alert signal data from the transmission.

The video display may further comprise a text overlay which is configured to display textual data related to the transmission. The receiving unit may further comprise a receiving unit indicator light in electrical communication with the receiving unit microprocessor. The system may have an effective range of the transmission is five hundred feet and may have a housing which is capable of being angled relative to a base.

In a separate embodiment, the system may also comprise in addition to the forgoing a biometric transmitting unit capable of being worn on a monitored user. The biometric unit is capable of generating a second transmission which may comprise a pulse rate data, a blood oxygen level data, a body temperature data and a blood pressure data. The second transmission is transmitted to the transmitting unit and then relayed via a biometric transmitter to the receiving unit while the receiving unit alerts the monitoring user to the receipt of the first transmission and the second transmission. In this configuration, the video display further comprises a text overlay which is configured to display textual data related to the first transmission and the second transmission. While the biometric unit may take the form of a sock.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
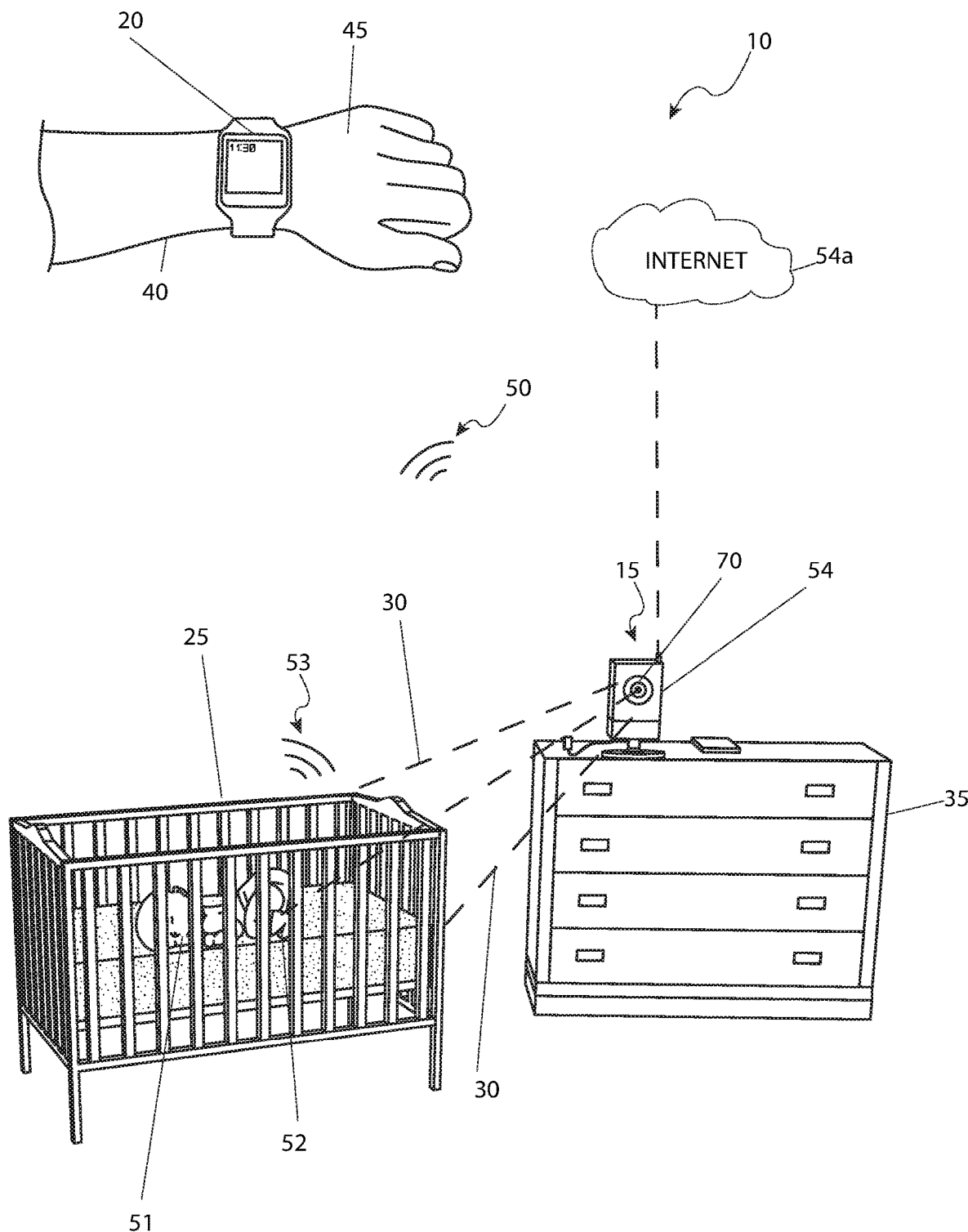
FIG. 1 is an overall descriptive view of the child monitor 10, according to a preferred embodiment of the present invention.

10 child monitor
15 transmitting unit
20 receiving unit
25 monitored location
30 line of sight
35 supporting surface
40 wrist 45 monitoring user
50 first RF signal
51 infant
52 sensing sock
53 second RF signal
54 biometrics transceiver
54a internet based cloud storage medium
55 housing
60 adjustable base
65 travel path
70 video camera
75 power indicator light
80 power adapter
85 power cord
90 microphone
95 wrist strap
97 receiving unit microprocessor
100 video screen
105 device face
110 live image
115 indicating lamp
120 speaker
125 vibrating assembly
126 text overlay
130 power supply
132 transmitting unit microprocessor
135 transmitter
140 internal transmitting antenna
145 amplifier
150 alarm circuit
155 internal receiving antenna
160 receiver
165 rechargeable battery

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a front view of the child monitor 10, according to the preferred embodiment of the present invention, is disclosed. The child monitor for the hearing impaired 10 (herein described as the "device") 10, includes two (2) main components, a transmitting unit 15, and a receiving unit 20. The transmitting unit 15 is positioned at a monitored location 25 such that the transmitting unit 15 is provided with line of sight 30. The monitored location 25 is depicted here as a child's crib such that a child could be monitored while sleeping. However, any location, such as a play area, a yard, a playpen, could be monitored as well, and as such, should not be interpreted as a limiting factor of the present invention. It is also envisioned that the utilization of the device 10 could be expanded beyond use with infants and children and could also be utilized with elderly adults, mentally disabled individuals, pets, or even personal property that could be subject to unauthorized access. Thus, the use of the device 10 with only children or infants is also not intended to be a limiting factor of the present invention.

The transmitting unit 15 is located on a supporting surface 35 such as a dresser as shown, or a changing table, shelf, or other similar location where it cannot be physically contacted by the child, infant, pet, person, or the like being monitored. The transmitting unit 15 then wirelessly communicates with the receiving unit 20, worn on the wrist 40 of a monitoring user 45. The monitoring user 45 is envisioned to be a parent in the case of a monitored child, or a care provider in the case of an adult, pet, or personal property location. The transmitting unit 15 communicates via a first RF signal 50 with the receiving unit 20. The first RF signal 50 carries video signals, audio signals, and alert signals and will be described in greater detail herein below. The first RF signal 50 is envisioned to have an effective range of five hundred feet (500 ft.) from the transmitting unit 15, adequate to cover a typical home area including a house and yard. It is not intended to provide long range coverage as the ability of the monitoring user 45 to respond to the monitored location 25 would be impractical.

It is envisioned that an enhanced version of the device 10 would allow for biometrics monitoring. The infant 51 would be provided with a sensing sock 52 that is worn while in the monitored location 25. The sensing sock 52 would be equipped with various biometric sensors that would monitor biometric signal including but not limited to: pulse rate, blood oxygen level, body temperature, and/or blood pressure. This biometric data is transmitted by a second RF signal 53 to a biometrics transceiver 54 provided on the transmitting unit 15. Furthermore, the biometrics data can be transmitted to an internet-based cloud storage medium 54a thereby allowing access to live and historical data by any internet connected computing appliance such as a smart phone, a tablet computer, a laptop computer, a desktop computer or the like. It is envisioned that while many types and brands of biometric sensors may be incorporated into the sock, at least one such sensor would be similar to that of a Concord Health Pulse Oximeter. The Concord Health Pulse Oximeter is capable of obtaining pulse rate data, blood oxygen level data, body temperature data and blood pressure data of a monitored user who is in sufficient proximity to the sensor to generate a signal comprising at least one set of the aforementioned types of data.

Figure 2:
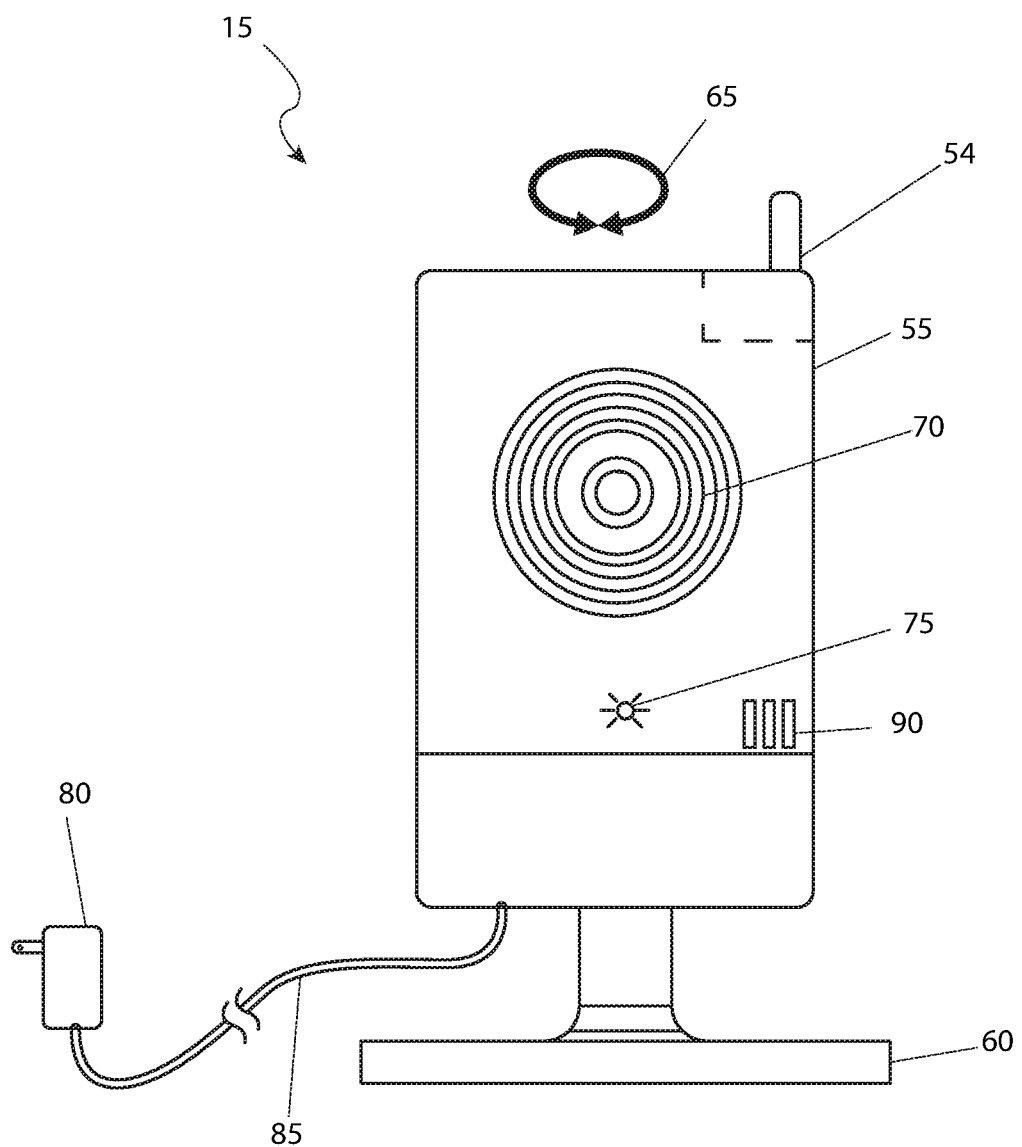
FIG. 2 is a front view of the transmitting unit 15, as used with the child monitor 10, according to the preferred embodiment of the present invention.

Referring next to FIG. 2, a front view of the transmitting unit 15, as used with the child monitor 10, according to the preferred embodiment of the present invention, is depicted. The transmitting unit 15 includes a housing 55 supported by an adjustable base 60. The adjustable base 60 provides the ability of the housing 55 to be angled through a three hundred sixty-degree (360°) travel path 65 such that a video camera 70 may obtain the proper line of sight 30 (as shown in FIG. 1). The housing 55 also includes a power indicator light 75 to indicate that electrical power from a power adapter 80 is being supplied through a power cord 85. Additionally, a microphone 90 is provided on the housing 55 to generate an electrical signal based upon ambient noise in the monitored location 25 (as shown in FIG. 1). The microphone 90 is utilized in the transmission of audio from the monitored location 25 (as shown in FIG. 1) and is utilized in the generation of alert signals should excessive noise levels be generated at the monitored location 25 (as shown in FIG. 1). Further description of the alerting feature of the device 10 will be provided herein below. The transmitting unit 15 is also provided with the biometric receiver 54 on enhanced model versions of the device 10.

Figure 3:
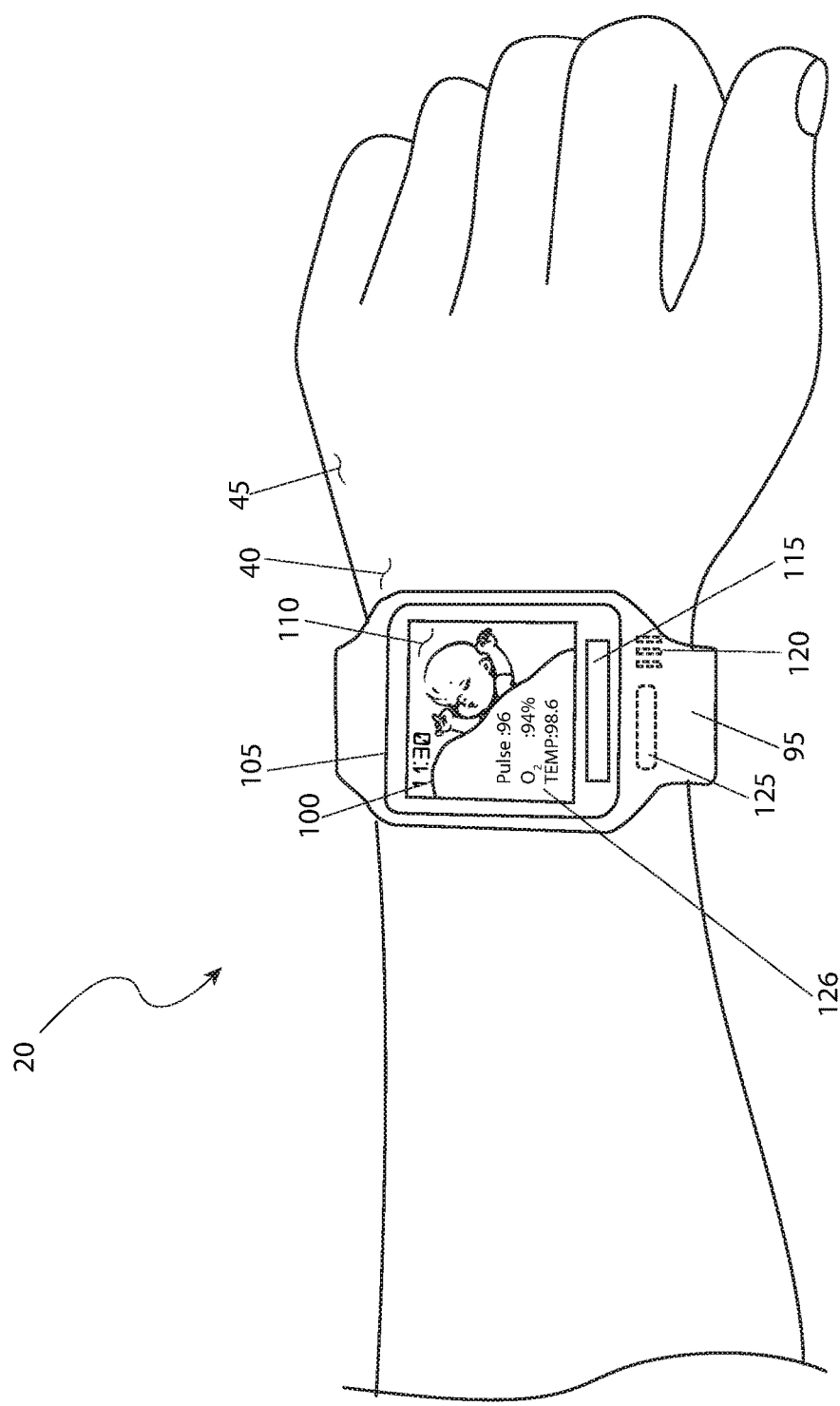
FIG. 3 is a front view of the receiving unit 20, as used with the child monitor 10, according to the preferred embodiment of the present invention; and, FIG. 4 is a functional electrical block diagram of the child monitor 10, according to the preferred embodiment of the present invention.

Referring now to FIG. 3, a front view of the receiving unit 20, as used with the child monitor 10, according to the preferred embodiment of the present invention, is shown. The receiving unit 20 is worn on the wrist 40 of the monitoring user 45 as aforementioned described. The receiving unit 20 is held in position by a wrist strap 95 of a generic style such as elastic, mechanically fastened, hook-and-loop-type fastener, buckle, or the like. The use of any particular style or type of wrist strap 95 is not intended to be a limiting factor of the present invention. A video screen 100 predominately occupies a device face 105 and provides a live image 110 of the view seen by the video camera 70 (as shown in FIG. 2). An indicating lamp 115, also located on the device face 105, flashes in the event of an audio alert to gain in capturing the attention of the monitoring user 45, particularly those who may be hearing impaired. A speaker 120 reproduces audio captured by the microphone 90 (as shown in FIG. 2) at the monitored location 25 (as shown in FIG. 1). Finally, a vibrating assembly 125, (shown by hidden lines due to its interior location) such as a motor with an offset weight, provides further alerting functions to those who may be hard of hearing.

It is envisioned that the receiving unit 20 is powered by rechargeable batteries to allow for portable operation over a multi-hour period. All versions of the receiving unit 20 will display time data, preferably digitally. On enhanced model versions of the receiving unit 20, the live image 110 would provide a text overlay 126 that would provide a graphic text-based image of data including but not limited to: pulse rate, blood oxygen level, body temperature, and/or blood pressure as provided by the sensing sock 52 (as shown in FIG. 1).

Figure 4:
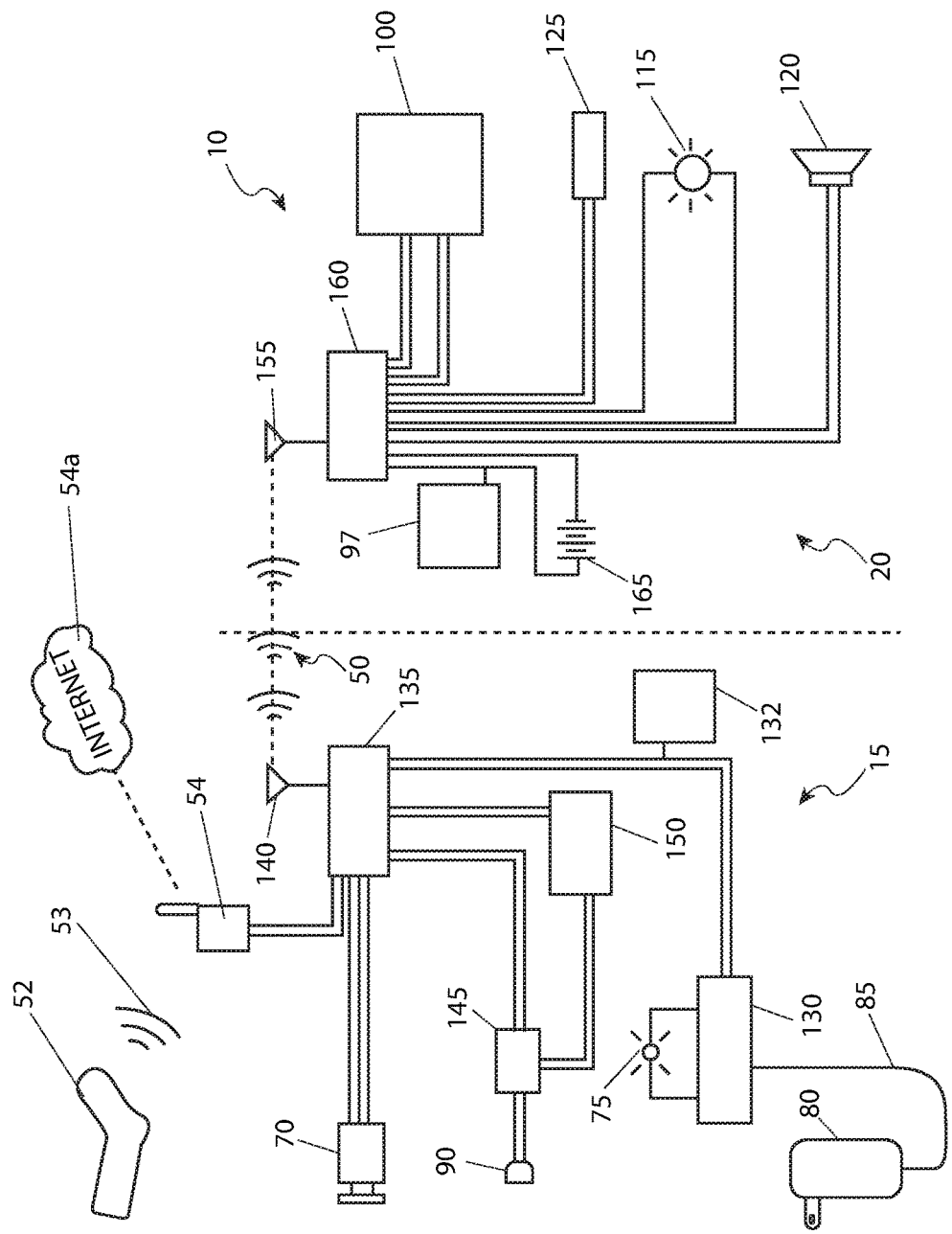

Referring finally to FIG. 4, a functional electrical block diagram of the child monitor 10, according to the preferred embodiment of the present invention, is disclosed. The transmitting unit 15 and receiving unit 20 are represented on the left and right half of the figure respectively. The power adapter 80 and power cord 85 provide power to a power supply 130 which is in electrical communication with a transmitting unit microprocessor 132. The power supply 130 also provides an electrical signal to illuminate the power indicator light 75 when active. The transmitting unit microprocessor 132 in turn is in electrical communication with a transmitter 135 complete with an internal transmitting antenna 140. The video camera 70 then interfaces with the transmitter 135 to provide a video signal. The microphone 90 is electrically connected to an amplifier 145 which also interfaces with the transmitter 135 to provide an audio signal. The amplifier 145 also interfaces with an alarm circuit 150 which produces an alert signal in the event of high level audio, such as a baby crying, a pet barking, an adult asking for help, or the like.

Finally, the alarm circuit 150 also interfaces with the transmitter 135 to provide an alert signal to the receiving unit 20. The video signal, audio signal, and alert signal are then multiplexed by the internal transmitting antenna 140 and transmitted over the first RF signal 50. The first RF signal 50 is then received by an internal receiving antenna 155 connected to a receiver 160 of the receiving unit 20. The receiver 160 receives power from a rechargeable battery 165. The video signal, the audio signal, and the alert signal are then demultiplexed and distributed to the other electrical components of the receiving unit 20. The video signal is passed to the video screen 100. The audio signal is passed to the speaker 120. Finally, the alert signal is passed to both the indicating lamp 115 and the vibrating assembly 125.

Enhanced model versions of the device 10 would utilize the sensing sock 52 interface as shown. The sensing sock would connect to the biometrics transceiver 54 by the second RF signal 53. The biometrics transceiver 54 would connect to the transmitter 135 for purposes of relaying data via the text-based overlay 126 (as shown in FIG. 3). In turn, the biometric transceiver 54 would relay the pertinent data to the internet-based cloud storage medium 54a as shown.

The preferred embodiment of the present invention can be utilized by the common user in a simple and effortless manner with little or no training. It is envisioned that the apparatus 10 would be constructed in general accordance with FIG. 1 through FIG. 4.

After procurement of the device 10, the transmitting unit 15 would be placed upon a suitable supporting surface 35 at the monitored location 25 with the power adapter 80 connected to a suitable source of AC electric power. The video camera 70 is then moved such that a suitable line of sight 30 of the monitored location 25 is obtained. Next, after assuring that the rechargeable battery 165 is properly charged, the receiving unit 20 is placed upon the wrist 40 of the monitoring user 45 and the device 10 is ready for utilization.

During utilization of the device 10, the monitoring user 45 continues on with other daily tasks or duties within the coverage area of the first RF signal 50. In the event of an audio event above a certain threshold, the alarm circuit 150 produces an alert signal that is carried over the first RF signal 50 along with the video signal and audio signal. Such an alert signal will instantaneously result in the indicating lamp 115 and vibrating assembly 125 being activated on the receiving unit 20 thus capturing the attention of the monitoring user 45, even in the case of the hearing impaired. The monitoring user 45 can then observe the situation visually via the video screen 100 or audibly via the speaker 120 to determine if remedial action is required. The alerting function will automatically reset the indicating lamp 115 and speaker 120 upon cessation of the audio event. Likewise, the usage of the device 10 with the enhanced monitoring capability of the sensing sock 52 would relay biometric data along with the video and audio signals as defined above. Such a process continues in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A child monitoring system, comprising:
    a transmitting unit, comprising:
        a housing defining an interior;
        a power source;
        a transmitting unit microprocessor in electrical communication with said power source;
        a video camera disposed upon an exterior surface of said housing in electrical communication with said transmitting unit microprocessor;
        a transmitter in electronic communication with said transmitting unit microprocessor; and a receiving unit in direct wireless communication with said transmitting unit having a rechargeable power source in electrical communication with a receiving unit microprocessor and a receiving unit receiving antenna, worn on a monitoring user;

wherein said transmitting unit generates a transmission, comprising:
a plurality of video signal data;
a plurality of audio signal data; and
a plurality of alert signal data;

wherein said transmission is directly transmitted to said receiving unit;

wherein said receiving unit alerts said monitoring user to receipt of said transmission;

wherein said transmitting unit includes a transmitting unit indicator light disposed upon said exterior surface of said housing adjacent said video camera and in electrical communication with said transmitting unit microprocessor;

wherein said receiving unit includes a video display displaying said video signal data from said first transmission;

wherein said receiving unit includes a speaker emitting said audio signal data from said transmission;

wherein said receiving unit includes a vibrating assembly vibrating upon receipt of said alert signal data from said transmission;

wherein said receiving unit includes a receiving unit indicator light in electrical communication with said receiving unit microprocessor;

wherein an effective range of said transmission is five hundred feet; and wherein said housing is angled relative to a base.

2. The system of claim 1, wherein said transmitting unit further comprises a microphone generating said audio signal data of said transmission.

3. The system of claim 1, wherein said video display further comprises a text overlay to display textual data related to said transmission.

4. A child monitoring system, comprising:
a transmitting unit comprising:
a housing defining an interior;
a power source;
a transmitting unit microprocessor in electrical communication with said power source;
a video camera disposed upon an exterior surface of said housing in electrical communication with said transmitting unit microprocessor;
a transmitter in electronic communication with said transmitting unit microprocessor;
a receiving unit directly in wireless communication with said transmitting unit having a rechargeable power source in electrical communication with a receiving unit microprocessor and receiving unit receiving antenna, worn on a monitoring user; and a biometric transmitting unit worn on said monitored user;

wherein said transmitting unit generates a first transmission, comprising:
a plurality of video signal data;
a plurality of audio signal data; and
a plurality of alert signal data;

wherein said biometric unit generates a second transmission, comprising:
a plurality of pulse rate data;
a plurality of blood oxygen level data;
a plurality of body temperature data; and
a plurality of blood pressure data;

wherein said biometric unit includes a sock that is worn while in a monitored location, said sock is equipped with various biometric sensors that monitor a biometric signal regarding a piece of medical data selected from the group consisting of a pulse rate, a blood oxygen level, a body temperature, and a blood pressure;

wherein said biometric data is transmitted by a second RF signal directly to a biometrics transceiver provided on said transmitting unit;

wherein said first transmission is transmitted to said receiving unit;

wherein said second transmission is transmitted to said transmitting unit and then relayed via said biometric transmitter to said receiving unit;

wherein said receiving unit alerts said monitoring user to receipt of said first transmission and said second transmission;

wherein said transmitting unit further comprises a transmitting unit indicator light disposed upon said exterior surface of said housing adjacent said video camera and m electrical communication with said transmitting unit microprocessor;

wherein said receiving unit comprises a video display displaying said video signal data from said first transmission;

wherein said receiving unit further comprises a speaker emitting said audio signal data from said first transmission;

wherein said receiving unit further comprises a vibrating assembly vibrating upon receipt of said alert signal data from said first transmission;

wherein an effective range of said first transmission and said second transmission is five hundred feet; and wherein said housing is capable of being angled relative to a base.

5. The system of claim 4, wherein said transmitting unit further comprises a microphone generating said audio signal data of said first transmission.

6. The system of claim 4, wherein said video display further comprises a text overlay to display textual data related to said first transmission and said second transmission.

* * * * *